(12) United States Patent
Tozawa

(10) Patent No.: US 6,811,330 B1
(45) Date of Patent: Nov. 2, 2004

(54) STRUCTURE FOR MOUNTING CAMERAS ON A VEHICLE

(75) Inventor: Yoshio Tozawa, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 148 days.

(21) Appl. No.: 09/665,105

(22) Filed: Sep. 20, 2000

(30) Foreign Application Priority Data

Sep. 22, 1999 (JP) ............................................ 11-269274

(51) Int. Cl.[7] .................... G03B 17/00; B60R 11/04; B60R 1/04; B60R 21/00
(52) U.S. Cl. .................. 396/428; 396/325; 396/429; 224/321; 224/557; 224/564; 224/929; 248/205.1; 296/203.02; 348/47; 348/118; 348/373; 701/28
(58) Field of Search ...................... 296/203.01, 204, 296/203.02, 37.7, 37.1, 210; 396/324, 325, 419, 427, 428, 429; 348/47, 118, 119, 373; 248/205.1, 207, 343; 224/483, 564, 557, 929, 309, 321; 701/28, 93, 94, 95, 96, 97, 98

(56) References Cited

U.S. PATENT DOCUMENTS

| | | | | |
|---|---|---|---|---|
| 5,530,420 A | * | 6/1996 | Tsuchiya et al. | 340/435 |
| 5,699,057 A | * | 12/1997 | Ikeda et al. | 340/937 |
| 5,835,806 A | * | 11/1998 | Kautz | 396/419 |
| 5,978,017 A | * | 11/1999 | Tino | 348/148 |
| 6,083,353 A | * | 7/2000 | Alexander, Jr. | 202/158 |

FOREIGN PATENT DOCUMENTS

| | | |
|---|---|---|
| JP | 11-78717 | 3/1999 |
| JP | 11-301365 | 11/1999 |

* cited by examiner

Primary Examiner—Russell Adams
Assistant Examiner—Rochelle Blackman
(74) Attorney, Agent, or Firm—Smith, Gambrell & Russell, LLP

(57) ABSTRACT

Each of the CCD cameras 10A, 10B for making a film of a vehicle forward road environment is mounted on the both ends of a chassis 16 with a high stiffness. A mounting seat member 17 is formed at a center of the chassis 16. The CCD cameras 10A, 10B are mounted onto a vehicle body through fixing the mounting seat member 17 onto the vehicle body. Portions other than the mounting seat member 17 of the chassis 16 are disposed apart from the vehicle body.

17 Claims, 6 Drawing Sheets

STRUCTURE FOR MOUNTING CAMERAS ON A VEHICLE

BACKGROUND OF THE INVENTION

The present invention relates to a structure for mounting cameras on a vehicle, and more particularly to a mounting structure of cameras which are mounted on a vehicle for obtaining forward environmental data while running in a vehicle drive supporting system.

In recent years, a vehicle drive supporting system with a camera mounted on a vehicle has been proposed, wherein information for safety is supplied to a driver, or a vehicle control is automatically performed, based on the forward data in a vehicle running direction which are obtained by the camera while running.

Conventionally, as a mounting structure of a camera mounted on a vehicle, a structure described in a publication of Japanese Patent Application Laid-Open No. 11-78717 has been known. The publication discloses a structure for mounting a camera inside a front windshield (front glass) of a vehicle, or for mounting a camera as a unit on a room mirror for confirming a rearward direction.

When the mounting structure described in the above-mentioned publication is applied to so-called stereo cameras which have one camera on the right and left sides, respectively, two cameras are mounted on each side of a front glass through a stay. However, in this mounting method, there are problems that each position of the both cameras is apt to be relatively tilted because of unavoidable unevenness when manufacturing the front glass and a vehicle body. If each position of cameras is deviated from a correct position thereof, an accuracy of obtained image data may be lowered. As a result, for example, it may be not accurately performed to measure a distance between an own car and a forward running car, so that the vehicle drive supporting system can not be accurately operated.

Furthermore, since the cameras are independently fixed on the front glass through the stay according to the conventional method, a relative accuracy of an optical axis between the cameras mounted on the both sides is apt to change because of vibration caused while running, a distortion of vehicle body, and a temperature difference inside a vehicle, so that the accuracy of obtained image data is lowered. In addition, a posture such as angle must be adjusted in each camera upon manufacturing, wherein it takes much time to do so. As a result, a productive efficiency thereof is lowered.

SUMMARY OF THE INVENTION

The present invention has been developed in view of the aforementioned problems, and an object of the present invention is to provide a structure for mounting cameras on a vehicle wherein a relative position between cameras disposed on the both sides can be accurately kept even if vibration while running and/or a temperature difference inside a vehicle influences the cameras, so that an accuracy of the obtained image data is not lowered under any situation.

A first aspect of the present invention is to provide a structure for mounting cameras on a vehicle comprising a chassis having a predetermined length and extended in a lateral direction, a pair of cameras mounted on both sides of a vehicle for making a film of a forward road environment when running, each camera being mounted on both ends of the chassis, and a mounting seat maybe formed in a center of the chassis, wherein the mounting seat member is fixed onto a predetermined mounting position of a vehicle body so as to mount the pair of cameras on the vehicle body, and portions other than the mounting seat member of the chassis are disposed apart from the vehicle body.

According to the above-mentioned constructions, since the two cameras are mounted on the both ends of the chassis, the relative accuracy of each optical axis between the right and left cameras can be prevented from lowering due to vibration when running or temperature difference. Also, since the chassis is fixed onto the vehicle body with a small compressed area, the image data obtained from the both cameras suffers little influence of vibration when running, and the like, so that the reliability of a drive supporting system can be improved.

A second aspect of the present invention is to provide the structure for mounting cameras on a vehicle according to the first aspect which a taper plate further intervenes between the mounting seat member and the mounting position on the vehicle body when fixing the chassis onto the mounting position of the vehicle body.

A third aspect of the present invention is to provide the structure for mounting cameras on a vehicle according to the first aspect which a plurality of taper plates are further prepared in advance, the taper plates being formed by wedgelike plates with different taper angle when fixing the chassis onto the mounting position of the vehicle body, wherein the taper plate having the most adequate taper angle of the plurality of taper plates intervenes between the mounting seat member and the vehicle body so as to dispose the pair of cameras mounted on the chassis in the predetermined mounting position of the vehicle body.

According to the above-mentioned second and third constructions, since the taper plate intervenes between the mounting seat member and a front rail of the vehicle body, it becomes easy to adjust the direction of the optical axis of the right and left cameras, so that a manufacturing efficiency can be improved.

A fourth aspect of the present invention is to provide the structure for mounting cameras on a vehicle according to the first to third aspects further comprising falling prevention members for engaging the both ends of the chassis with the vehicle body.

According to the above-mentioned fourth construction, since the falling prevention member is provided on the both ends of the chassis, it becomes easy to mount the chassis onto the vehicle body.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

A preferred embodiment of a mounting structure of cameras on a vehicle to which the present invention is applied will be explained below with reference to the attached drawings.

Figure 1:
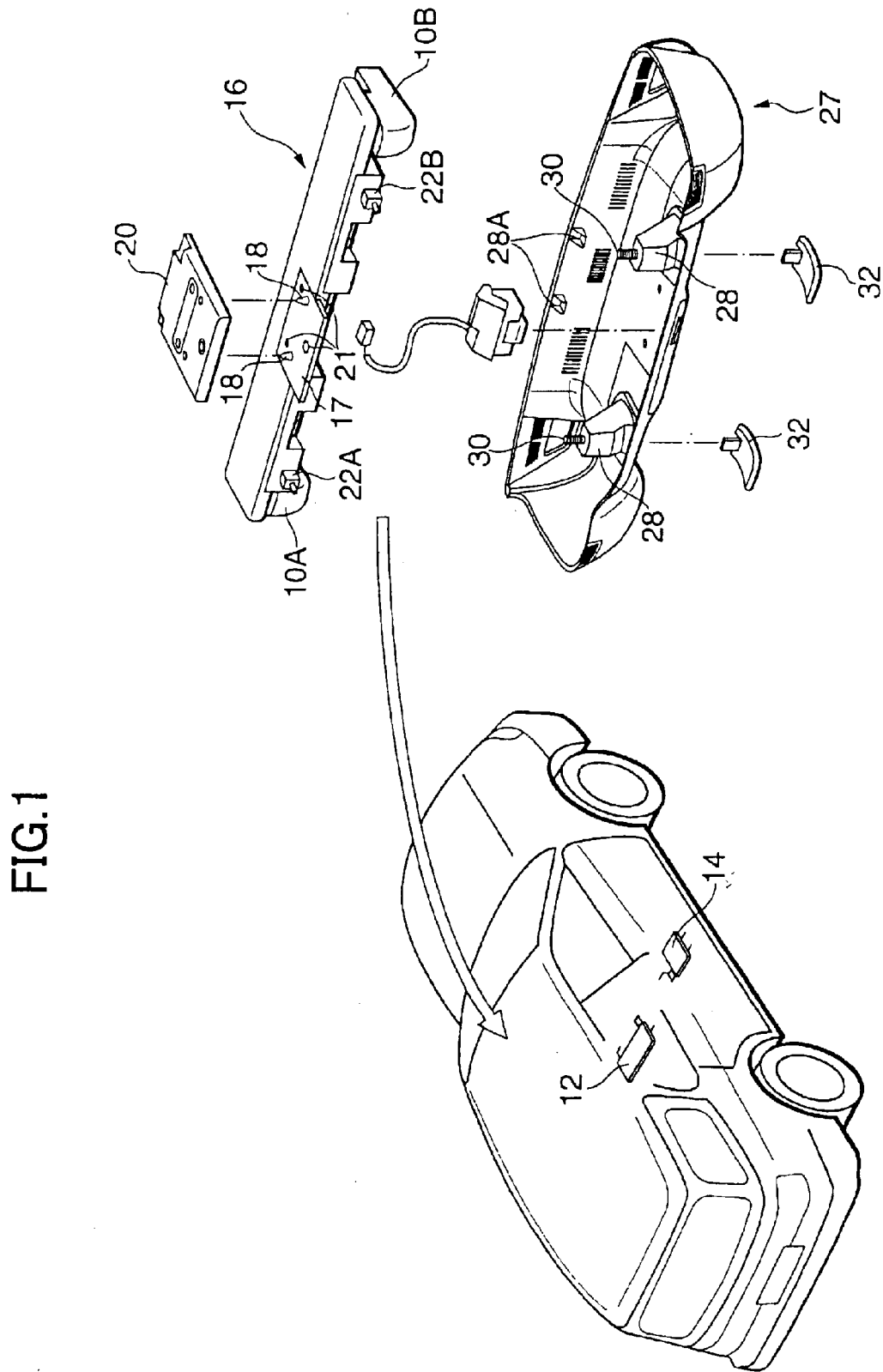
FIG. 1 is an explanatory view showing a vehicle drive supporting system having a mounting structure of cameras on a vehicle according to the present invention.

FIG. 1 is an explanatory view of a vehicle drive supporting system using cameras mounted on a vehicle. FIGS. 2–6 are views showing a mounting structure of cameras on a vehicle according to the present invention.

First, a summary of the vehicle drive supporting system will be explained hereinafter. The drive supporting system has a pair of charge coupled device cameras (hereinafter call CCD cameras) 10A, 10B for recognizing a forward road environment while running. An image signal obtained by these CCD cameras 10A, 10B in the vehicle running direction is inputted into an image processing unit 12, wherein the image signal is converted to a various kind of forward data such as distance data.

Furthermore, the obtained forward data, a road data outputted from a navigation system (not shown), and data of a vehicle running condition are inputted into a preview control unit (hereinafter call PCU) 14. The PCU 14 raises an alarm with regard to a distance between an own car and a forward running car, and carries out a various kind of control for a drive supporting such as cruise control. Therefore, the high accuracy of the forward data obtained by the CCD cameras 10A, 10B is indispensable for accurately operating the drive supporting system. The object of the present invention is to obtain an exact forward data through improving a mounting structure of the CCD cameras 10A, 10B on a vehicle and thereby raising a relative mounting accuracy between the CCD cameras 10A, 10B.

As shown in FIG. 1, the mounting structure of cameras of the present invention includes a chassis 16 for mounting the two CCD cameras 10A, 10B inside a vehicle as an important parts. The chassis 16 is a member which extends in a lateral direction. The CCD cameras 10A, 10B are mounted on the both ends of the chassis 16 which is formed by only one material having a high-stiffness and a high-coefficient of thermal conductivity such as an aluminum alloy.

Figure 2:
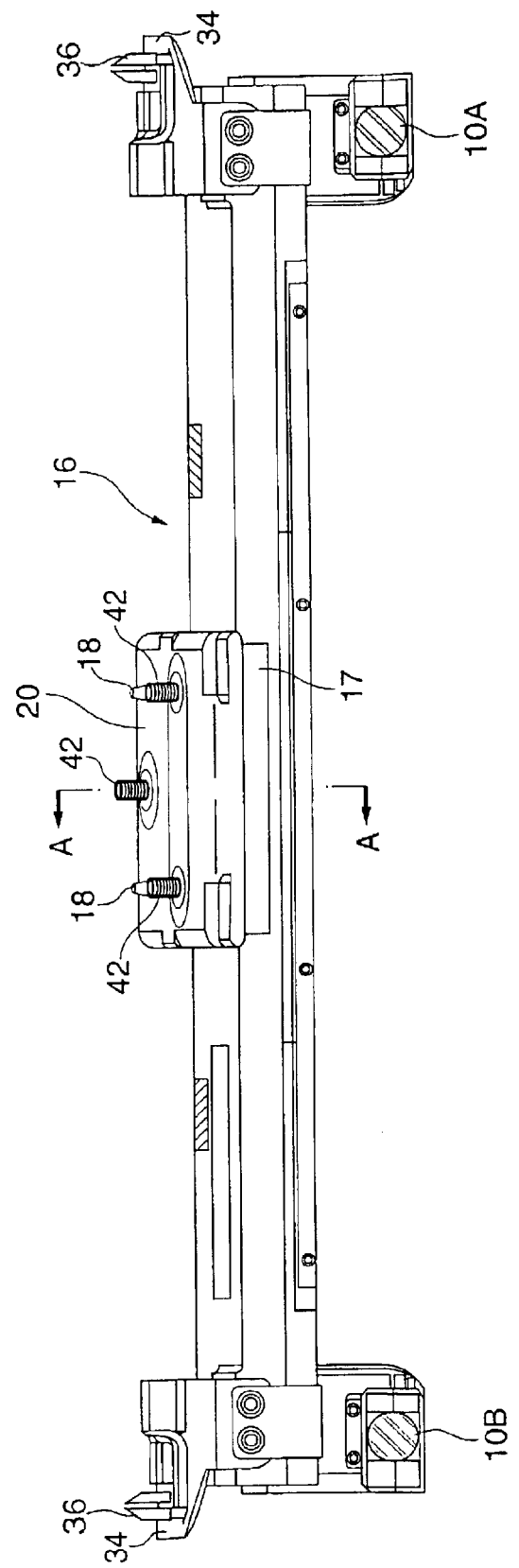
FIG. 2 is a front view of a chassis which is an important portion of the mounting structure of cameras on a vehicle according to the present invention.

On the central portion of the chassis 16 is integrally formed a mounting seat member 17 for fixing the chassis 16 on a front rail 40 of a vehicle body, which partially extends on a rear side of the chassis 16. Two pins 18 are attached onto an upper face of the mounting seat member 17. The pins 18 are engaged with positioning holes of the front rail 40 so as to position the chassis 16 at a predetermined mounting portion. As shown in FIGS. 1 and 2, the mounting seat member 17 includes three fixing holes 21 where bolts 42 for fixing the chassis 16 are inserted, as well as the pins 18. The mounting seat member 17 is formed with a width of, for example, only about 50 mm, and thus an area for mounting the mounting seat member 17 on the front rail 40 is very small.

Figure 3:
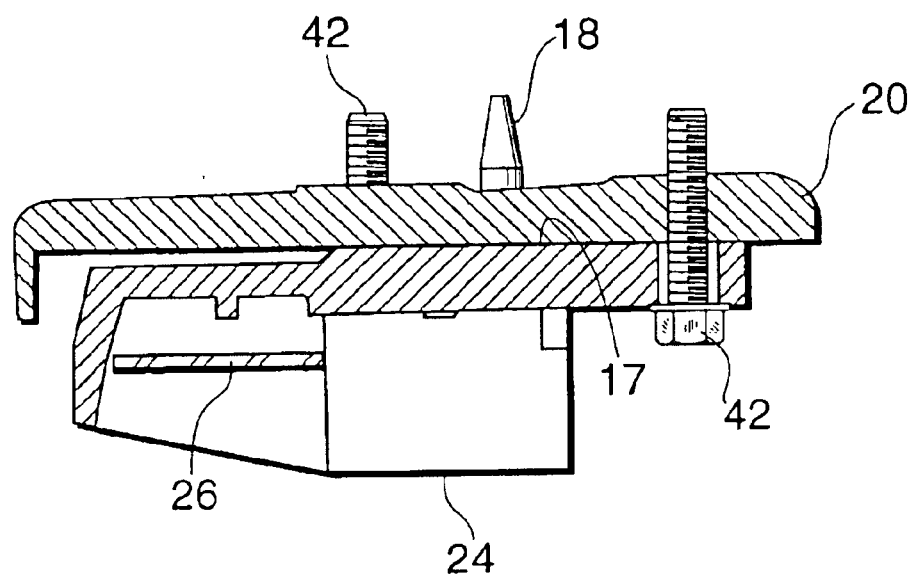
FIG. 3 is a sectional view along A—A line of FIG. 2.

When the chassis 16 is fixed on the front rail 40, a wedge-like taper plate 20 intervenes between the mounting seat member 17 and the front rail 40 as shown in FIGS. 2 and 3. A plurality of taper plates 20 with different taper angles are prepared in advance so as to enable a vertical angle of an optical axis of the CCD cameras 10A, 10B to change. As examples of the taper plate 20, there is a taper plate, an front side or a rear side of which is thinly formed, or which is evenly flat. When fixing the chassis 16, the taper plate 20 with a most adequate taper angle is selected, so that the optical axis of the CCD cameras 10A, 10B mounted on the chassis 16 can be minutely adjusted so as to be directed into the predetermined correct direction.

Figure 4:
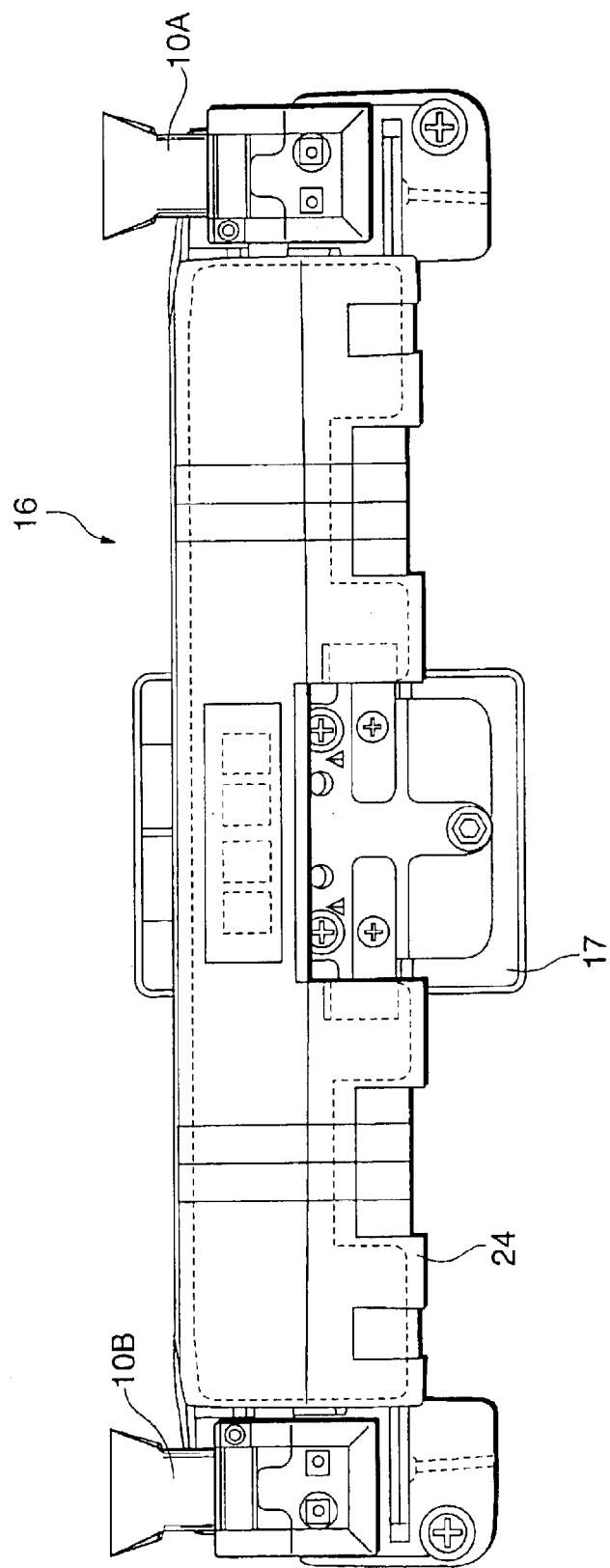
FIG. 4 is a bottom view of the chassis according to the present invention.

As shown in FIG. 1, on a back face of the chassis 16 are mounted connectors 22A, 22B for outputting an image data obtained by the right and left CCD cameras 10A, 10B. Also, as shown in FIGS. 3 and 4, an underside face of the chassis 16 is covered by a circuit cover 24, in which a circuit substrate 26 for controlling each of the CCD cameras 10A, 10B is contained in a space between the chassis is 16 and the circuit cover 24. The chassis 16 has a hooked sectional shape extending in a lateral direction to prevent the chassis 16 from being transformed due to a weight of the CCD cameras 10A, 10B and/or an acceleration while running.

The CCD cameras 10A, 10B and the chassis 16 fixed inside a vehicle are covered by an outside cover 27 made of resin, which has engaging portions 28A to be engaged with the chassis 16 at a tip end thereof, and recess portions 28 with a hole where bolts 30 are inserted. The outside cover 27 is mounted at a predetermined portion of the front rail 40 through fastening the bolts 30 into the front rail 40. The recess portion 28 is covered by a cap 32 after fastening the bolts 30.

Figure 5:
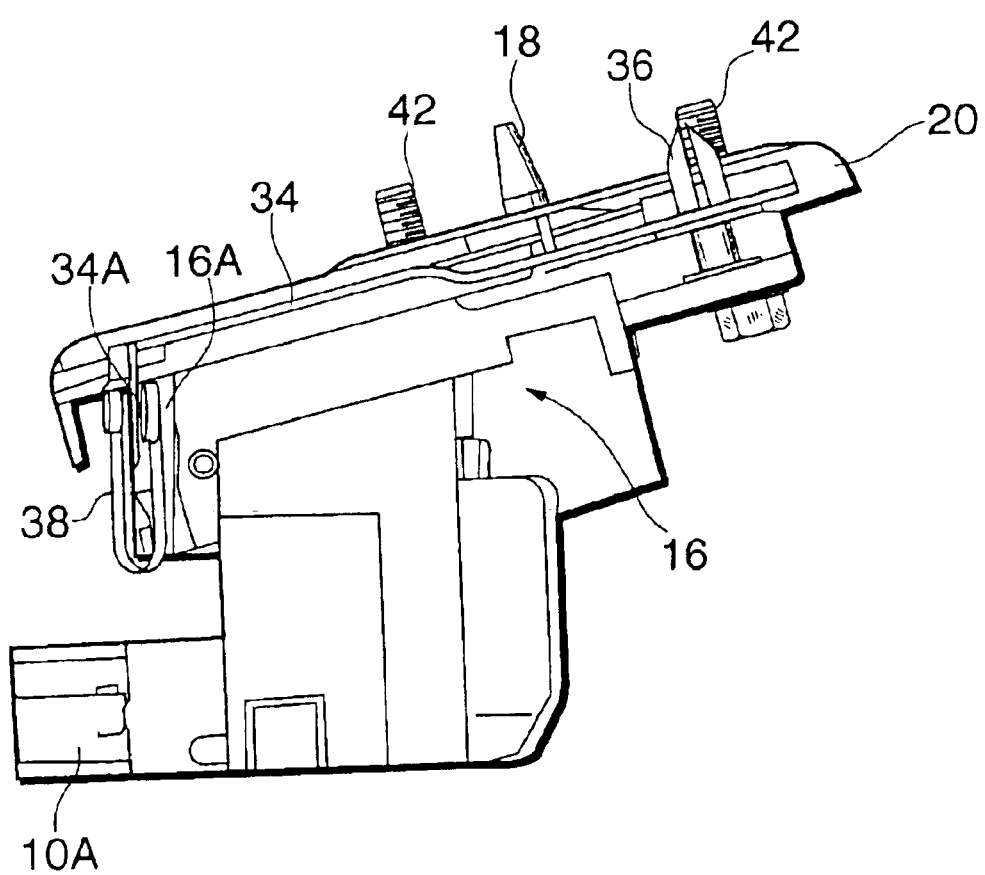
FIG. 5 is a side view of the chassis according to the present invention.
Figure 6:
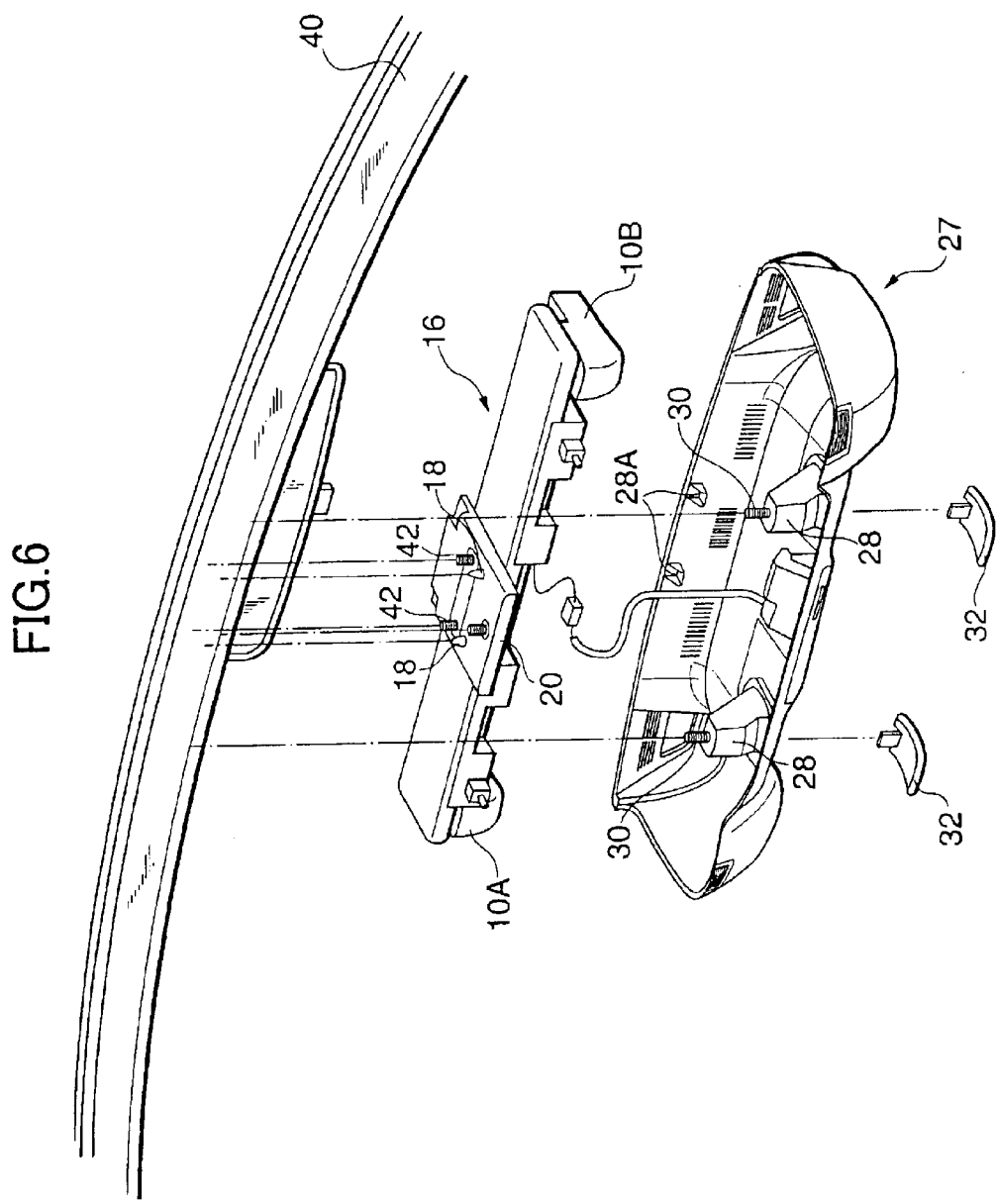
FIG. 6 is an exploded perspective view of the mounting structure of cameras on a vehicle according to the present invention.

The chassis 16 is supported on the front rail 40 inside a vehicle by the mounting seat member 17. As shown in FIG. 2, falling prevention brackets 34 are attached on an upper portion of both ends of chassis 16, and split pins 36 on an upper end thereof are inserted into holes (not shown) of the front rail 40. As shown in FIG. 5, the falling prevention bracket 34 is formed so as to cover the both upper ends of the chassis 16 as shown from right to left in FIG. 5. A front portion 34A of the bracket 34 is connected to a front end portion 16A of the chassis 16 through a belt 38 with U-shape shown in the side view in a vehicle running direction. Whereas the belt 38 prevents the chassis 16 from falling when mounting it, the mounting seat member 17 supports all weight of the chassis 16 including the CCD cameras 10A, 10B after the chassis 16 is fixed to the vehicle through using the taper plate 20. That is, the portions other than the mounting seat member 17 of the chassis 16 are kept under the conditions disposed substantially apart from the vehicle body after being fixed.

As mentioned above and shown in FIG. 6, according to the mounting structure of cameras on a vehicle of the present invention, the CCD cameras 10A, 10B are mounted on the both ends of the chassis 16, and the mounting seat member 17 disposed in the center of to the chassis 16 is attached with fixing holes (not shown) of the front rail 40 by screwing the three bolts 42, so that the chassis 16 can be fixed onto the front rail 40 with a small compressed area.

Thus, the CCD cameras 10A, 10B suffer little influence of vibration when running and of change of temperature inside a vehicle, so that the accuracy of mounting the both cameras 10A, 10B, i.e. of an optical axis thereof can be prevented from lowering. Consequently, the image data of the front environment obtained by the CCD cameras 10A, 10B can be prevented from deteriorating, and the reliability of the driving support system can be improved.

In addition, according to the present invention, the most adequate one of a plurality of taper plates 20 is selected and intervenient between the mounting seat member 17 and the front rail 40, so that an angle adjustment of the CCD cameras 10A, 10B can be easily made.

Furthermore, the chassis 16 supporting the CCD cameras 10A, 10B has enough cross-sectional area, and is formed by a uniform material with high-stiffness and high-coefficient of thermal conductivity. Therefore, a dimensional accuracy between the CCD cameras 10A, 10B is improved, and the thermal conductivity through the chassis 16 is performed quickly, so that there occurs little temperature difference between the CCD cameras 10A, 10B even if daylight is given on only one side, namely a thermal balance between the both cameras can be kept. As a result, an image output characteristic of the right and left CCD cameras is uniform, and the obtained image data is stabilized.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A structure for mounting cameras on a vehicle, comprising:
   a chassis having a predetermined length and extended in a lateral direction of a vehicle body; and
   a mounting seat surface formed in a center of an upper face of said chassis for mounting said chassis onto a predetermined mounting position of said vehicle body;
   a pair of stereo cameras mounted on said chassis for obtaining an image signal of a forward road environment, a camera being mounted on each end of said chassis; and
   a taper plate for adjusting a vertical angle of optical axis of said stereo cameras, said taper plate being formed of a wedge-like plate and sandwiched by said mounting seat surface of said chassis and said mounting position of said vehicle body when said chassis is mounted onto said vehicle body.

2. The structure for mounting camera on a vehicle according to claim 1, wherein;
   said taper plate is selected from a group consisting of the taper plates having different taper angles so that said optical axis of said stereo cameras is directed into a correct direction when said chassis is mounted onto the mounting position of the vehicle body.

3. The structure for mounting cameras on a vehicle according to claim 1, wherein
   said chassis has a hooked sectional shape extending in said lateral direction.

4. The structure for mounting cameras on a vehicle according to claim 1, wherein
   said chassis is formed by one material having a high-coefficient of thermal conductivity for performing the thermal conductivity quickly so as to keep a thermal balance between said pair of cameras.

5. The structure for mounting cameras on a vehicle according to claim 4, wherein
   said chassis is formed from an aluminum alloy.

6. The structure for mounting cameras on a vehicle according to claim 1, wherein
   said chassis is mounted onto a front rail of said vehicle body.

7. The structure for mounting cameras on a vehicle according to claim 1, wherein
   said chassis is supported by said vehicle body only through said mounting seat surface.

8. The structure for mounting cameras on a vehicle according to claim 1, wherein
   portions of said chassis other than said mounting seat surface are disposed apart from said vehicle body when said chassis is mounted on said vehicle.

9. The structure for mounting cameras on a vehicle according to claim 1, wherein
   said mounting seat surface has a width of about 50 mn in lateral direction.

10. A structure for mounting cameras on a vehicle, comprising:
    a chassis having a predetermined length and extended in a lateral direction;
    a pair of stereo cameras mounted on both ends of said chassis for obtaining an image signal of a forward road environment;
    a mounting seat member formed in a center of said chassis and fixed onto a predetermined mounting position of said vehicle body; and
    falling prevention members for engaging the both ends of said chassis with the vehicle body.

11. A structure for mounting cameras on a vehicle, comprising:
    a chassis having a predetermined length and extended in a lateral direction;
    a pair of stereo cameras mounted on both ends of said chassis for obtaining an image signal of a forward road environment;
    a mounting seat member formed in a center of said chassis and fixed onto a predetermined mounting position of said vehicle body; and
    falling prevention means for preventing said chassis from falling before said chassis is mounted onto said vehicle body.

12. The structure for mounting cameras on a vehicle according to claim 11, wherein said falling prevention means compromise:
    a pair of brackets attached on an upper portion of both ends of said chassis, having at last one split pin inserted into said vehicle body before said chassis is mounted onto the vehicle body; and
    a pair of belts being connected to said bracket at one end thereof and to said chassis at another end thereof.

13. The structure for mounting cameras on a vehicle according to claim 12, wherein said belt being bent in a U-shape does not support said chassis when said chassis is mounted onto the vehicle body.

14. A structure for mounting cameras on a vehicle, comprising:
    a chassis having a predetermined length and extended in a lateral direction of a vehicle body; and
    a pair of stereo cameras for mounting to said chassis to have a camera on a right and left side of said chassis for obtaining an image signal of a forward road environment of said vehicle, each of said right side and left side cameras being mounted on each right side and left side ends, respectively, of said chassis in said lateral direction having a positional relationship to each other;
    chassis having a mounting seat surface formed in a center of an upper face of said chassis and for mounting said chassis onto a predetermined mounting position of said vehicle body so as to mount said pair of stereo cameras on said vehicle body;
    said chassis having a hooked sectional shape extending in said lateral direction, a mounting seat member attached to said chassis at the mounting seat surface and a wedge shaped plate for attachment to said mounting seat member.

15. The structure for mounting cameras on a vehicle according to claim 14, wherein said chassis is formed by one material having a high-coefficient of thermal conductivity for performing thermal conductivity quickly so as to keep a thermal balance between said pair of cameras.

16. The structure for mounting cameras on a vehicle according to claim 15, wherein said chassis is formed from an aluminum alloy.

17. A structure for mounting cameras on a vehicle comprising:
   a chassis having a predetermined length and extended in a lateral direction of a vehicle body;
   a mounting seat surface formed in a center of an upper face of said chassis for mounting said chassis onto a predetermined mounting position of said vehicle body;
   a wedge shaped plate for attachment to the chassis:
   a pair of cameras mounted on said chassis for obtaining an image signal of a forward road environment, a camera being mounted on each end of said chassis; and
   a pin for positioning said chassis onto said predetermined mounting position of said vehicle body.

* * * * *